US 9,158,408 B2

(12) United States Patent
Amrutur et al.

(10) Patent No.: US 9,158,408 B2
(45) Date of Patent: Oct. 13, 2015

(54) SURFACES WITH EMBEDDED SENSING AND ACTUATION NETWORKS USING COMPLEMENTARY-METAL-OXIDE-SEMICONDUCTOR (CMOS) SENSING CHIPS

(75) Inventors: Bharadwaj Amrutur, Bangalore (IN); Navakanta Bhat, Karnataka (IN)

(73) Assignee: Indian Institute of Science (IN)

( * ) Notice: Subject to any disclaimer, the term of this patent is extended or adjusted under 35 U.S.C. 154(b) by 1127 days.

(21) Appl. No.: 12/869,020

(22) Filed: Aug. 26, 2010

(65) Prior Publication Data

US 2012/0007586 A1 Jan. 12, 2012

(30) Foreign Application Priority Data

Jul. 8, 2010 (IN) .............................. 1948/CHE/2010

(51) Int. Cl.
G01R 1/00 (2006.01)
G01R 29/00 (2006.01)
G06F 3/041 (2006.01)
G06F 3/01 (2006.01)

(52) U.S. Cl.
CPC .............. *G06F 3/0416* (2013.01); *G06F 3/016* (2013.01)

(58) Field of Classification Search
CPC ........... G01R 1/04; G01R 13/407; G01D 1/00
USPC ........... 324/114, 76, 757.05, 762.06; 382/124
See application file for complete search history.

(56) References Cited

U.S. PATENT DOCUMENTS 5,325,442 A * 6/1994 Knapp ..................... 382/124
5,592,222 A * 1/1997 Nakamura et al. ............ 348/294
5,978,496 A * 11/1999 Harkin ....................... 382/124

(Continued)

OTHER PUBLICATIONS

Someya et al., "A large-area, flexible pressure sensor matrix with organic field-effect transistors for artificial skin applications", PNAS, vol. 101, No. 27, Jul. 6, 2004, pp. 9966-9970.

(Continued)

*Primary Examiner* — Huy Q Phan
*Assistant Examiner* — Giovanni Astacio-Oquendo
(74) *Attorney, Agent, or Firm* — Moritt Hock & Hamroff LLP; Steven S. Rubin, Esq.

(57) ABSTRACT

A device and method for area sensing and actuation comprises highly scalable sensing and actuation network that can control a high density of sensing and actuation elements over a physical area. The device comprises a matrix of CMOS sensing chips that each comprise a plurality of sensing electrodes arranged in a matrix of columns and rows along horizontal wires and vertical wires. The vertical wires carry an activation signal to activate a column of sensing electrodes, and the vertical wires carry sensing and actuation signals between the column of sensing electrodes and a processing chip. The signals may be amplified by CMOS sensing chips between the source and destination of the signals. In this way, signals may be received from and sent to a dense matrix of sensing electrodes spanning a large geographic area with little or no degradation.

20 Claims, 8 Drawing Sheets

(56) References Cited

U.S. PATENT DOCUMENTS

| | | | |
|---|---|---|---|
| 6,570,617 B2* | 5/2003 | Fossum et al. | 348/308 |
| 6,825,539 B2 | 11/2004 | Tai et al. | |
| 6,953,982 B1 | 10/2005 | Tai et al. | |
| 7,190,397 B2* | 3/2007 | Andersson | 348/302 |
| 7,720,265 B2* | 5/2010 | Bustgens et al. | 382/124 |
| 8,199,073 B2* | 6/2012 | Chung et al. | 345/76 |
| 2003/0179164 A1* | 9/2003 | Shin et al. | 345/76 |
| 2005/0231855 A1* | 10/2005 | Tran | 360/324.1 |
| 2006/0289726 A1* | 12/2006 | Paulus et al. | 250/221 |
| 2007/0008299 A1* | 1/2007 | Hristov | 345/173 |
| 2008/0063246 A1* | 3/2008 | Dinh | 382/124 |
| 2010/0276572 A1* | 11/2010 | Iwabuchi et al. | 250/208.1 |

OTHER PUBLICATIONS

Ko et al., "A hemispherical electronic eye camera based on compressible silicon optoelectronics", Nature, vol. 454, Aug. 2008, pp. 748-753.

Ko et al., "A hemispherical electronic eye camera based on compressible silicon optoelectronics (supplementary information)", Nature.

Papkostas et al., "5.3: A large area force sensor for smart skin applications", printed from internet: http://www.media.mit.edu/resenv/classes/MAS836/Readings/Tactile.pdf.

www.trecc.org/research/tt_smart_skin.php, "Smart skin and flow sensor technologies", (visited Aug. 26, 2010).

* cited by examiner

SURFACES WITH EMBEDDED SENSING AND ACTUATION NETWORKS USING COMPLEMENTARY-METAL-OXIDE-SEMICONDUCTOR (CMOS) SENSING CHIPS

CROSS-REFERENCE TO RELATED APPLICATION

The present patent application claims priority to Indian patent application serial number 1948/CHE/2010 filed on Jul. 8, 2010, the entire contents of which are herein incorporated by reference.

BACKGROUND

Human skin is an example of a large surface for sensing and actuation. Human skin is able to "sense" many types of signals such as temperature and pressure. Additionally, human skin is capable of many "actuations" as well, such as sweating or goose bumps. Such sensing and actuation has many practical applications, and models or reproductions of the skin's sensing and actuation capabilities have often been attempted. Among other things, sensing and actuation surfaces can be used in medical applications, such as in bio-signal recording interfaces for prosthetics. In any application, the types of sensing and actuation performed by the surface are tailored to the specific needs and desires of the application.

Surfaces with sensing and actuation abilities comparable to those of skin are difficult to achieve. In particular, human skin has a dense distribution of sensing and actuation cells that are interconnected by a large network of nerve fibers. On the other hand, though, in operation, each sensing and actuation cell is individually controlled by the brain. Replicating both the density and the operation of human skin proves challenging.

SUMMARY

A device and method for area sensing and actuation is presented. The device comprises a scalable sensing and actuation network that can control a high density of sensing and actuation elements over a physical area.

In one example, the device comprises a flexible substrate on which is patterned an array of horizontal and vertical wires. The device further comprises a matrix of complementary-metal-oxide-semiconductor (CMOS) sensing chips. The CMOS sensing chips comprise a matrix of sensing electrodes operable to receive sensed signals from and send actuation signals to sensing elements either located on or connected to the device. Each sensing electrode is positioned on the substrate at an intersection of the horizontal and vertical wires to form rows and columns of sensing electrodes. By transmitting signals to and receiving signals from the sensing electrodes via the horizontal and vertical wires, it is possible to individually control and sense each sensing electrode, for example. The sensing electrodes may be controlled by a processing chip. Rows or columns of sensing electrodes can be selectively activated such that sensed signals may be received from and/or actuation signals may be sent to each of the sensing electrodes on the activated row or column. The processing chip receives sensed signals from and sends actuation signals to the individual sensing electrodes so as to individually control and sense each sensing electrode.

In another aspect, a method is presented. The method includes a processing chip providing power to a plurality of sensing chips. The power is transmitted to each sensing chip on a path comprising horizontal wires, vertical wires, and sensing chips. Each sensing chip comprises a plurality of CMOS decoders, a plurality of CMOS selection transistors and a plurality of sensing electrodes arranged in a matrix of columns and rows along the horizontal wires and vertical wires. A CMOS decoder activates a column of sensing electrodes. One or more CMOS selection transistors receives a digital select signal and selects one or more rows of sensing electrodes according to the digital select signal. Each of the sensing electrodes that lies at the intersection of the activated column and a selected row is operable to receive sensed signals from and send actuation signals to a respective sensing element, for example. The sensed signals are transmitted to the processing chip via the horizontal wires. Each horizontal wire carries the sensed signal from a respective sensing electrode on the column of sensing electrodes. The sensed signals are amplified during transmission between the sensing electrodes and the processing chip.

Additionally, or in place of transmission of the sensed signals, actuation signals from the processing chip are transmitted to the sensing electrodes in the column of sensing electrodes via the horizontal wires. Each horizontal wire carries the actuation signal to a respective sensing electrode on the column of sensing electrodes. The actuation signals are amplified during transmission between the processing chip and the sensing electrodes. This method may be carried out repeatedly so as to generate a scan of the matrix of sensing electrodes.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
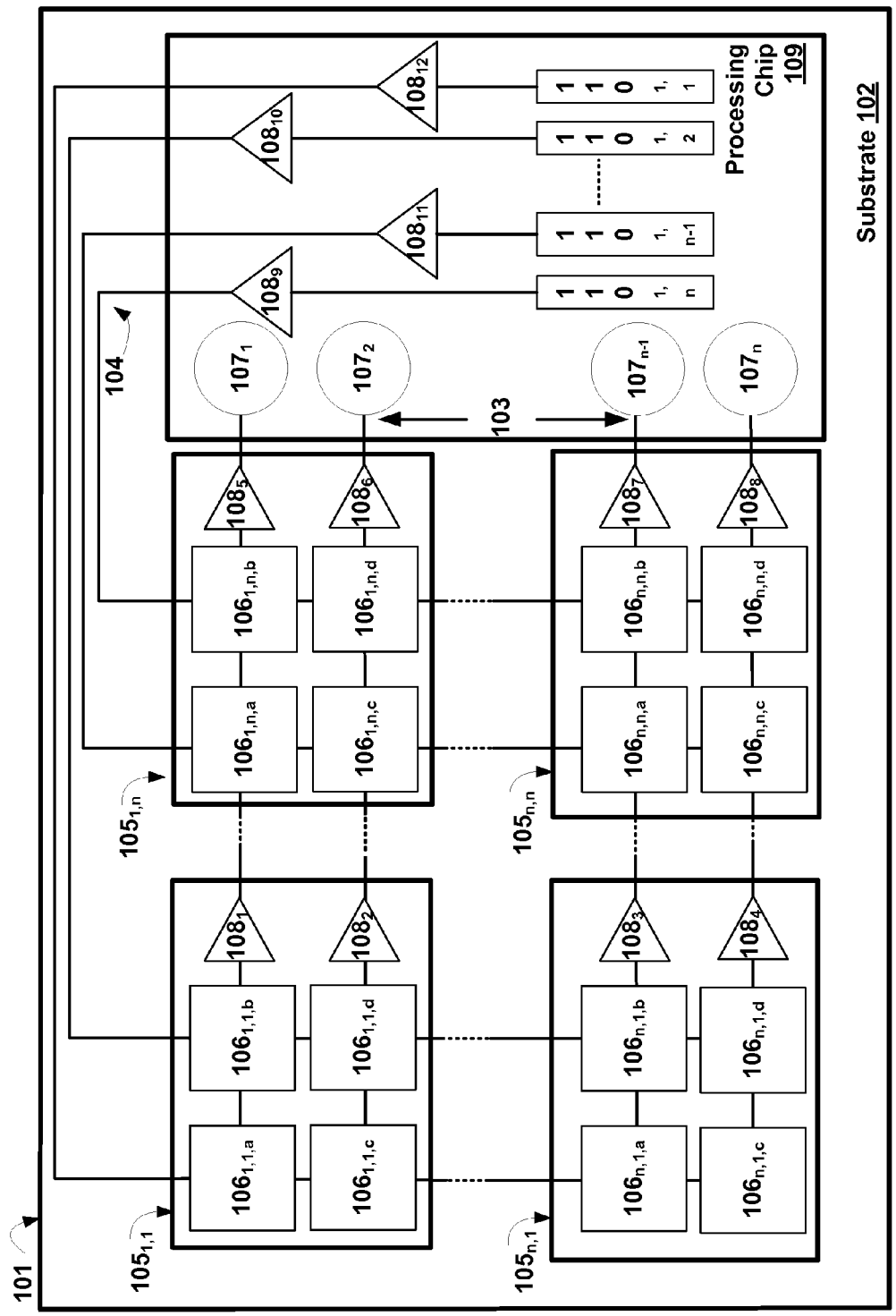
FIG. 1 depicts an example device for sensing and actuation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 depicts an example device for sensing and actuation 101. Device 101 is shown including a substrate 102, horizontal wires 103, and vertical wires 104. Additionally, device 101 is shown including a plurality of complementary-metal-oxide-semiconductor (CMOS) sensing chips 105 (comprising sensing electrodes 106) arranged in a matrix, a plurality of CMOS signal drivers 108, and a processing chip 109 comprising a plurality of CMOS selection transistors 107, CMOS signal drivers 108, and CMOS decoders 110.

Any number of CMOS sensing chips 105 may be present in the device 101. The CMOS sensing chip in the upper left hand corner of FIG. 1 is denoted $105_{1,1}$ to indicate that the CMOS sensing chip is in the first row and first column of the matrix of CMOS sensing chips. Similarly, the CMOS sensing chip in the lower right hand corner of FIG. 1 is denoted $105_{n,n}$ to indicate that that the CMOS sensing chip is in the $n^{th}$ row and $n^{th}$ column of the matrix of CMOS sensing chips 105. Any number of rows and any number of columns may make up the matrix of CMOS sensing chips 105.

Similarly, any number of sensing electrodes 106 may be present in a particular CMOS sensing chip 105. For example, CMOS sensing chip $105_{1,1}$ is shown comprising four sensing electrodes 106 (labeled $106_{1,1,a}$-$106_{1,1,d}$), but any number of sensing electrodes is possible.

The components of FIG. 1 are shown merely by way of illustration, and more or fewer components, both in number and type, may be present in real-world embodiments, depending on the purpose for which the embodiment is designed. Further, the relative positions of the components are merely illustrative unless context dictates otherwise. For example, any number of horizontal wires 103, vertical wires 104, CMOS sensing chips 105, sensing electrodes 106, CMOS selection transistors 107, CMOS decoders 110, or CMOS signal drivers 108 may be used, and many configurations are possible.

Device 101 is shown comprising the substrate 102. In one embodiment, the substrate 102 may be a flexible substrate. One example of such a flexible substrate is a plastic, such as polydimethylsiloxane (PDMS), that can be molded into a desired shape. In another embodiment, the substrate 102 may be rigid.

Device 101 is shown further comprising horizontal wires 103 and vertical wires 104. The horizontal wires 103 and the vertical wires 104 form an array, as shown. The horizontal wires 103 and vertical wires 104 cross to form intersections on the device 101, and serve to transmit signals among CMOS sensing chips 105, and between CMOS sensing chips 105 and the processing chip 109. In one embodiment, the horizontal wires 103 and vertical wires 104 may be printed directly onto the substrate 102. In another embodiment, the horizontal wires 103 and vertical wires 104 may be printed onto a separate flexible sheet that is attached to the substrate 102.

Device 101 is shown further comprising the plurality of CMOS sensing chips 105. Each CMOS sensing chip 105 comprises a plurality of sensing electrodes 106. Each sensing electrode 106 is connected to a sensing element (not shown), and each sensing electrode 106 is operable to receive sensed signals from and send actuation signals to a connected sensing element.

The sensing elements may be included in the device 101 or may be manufactured separately on another chip. In the embodiment where the sensing elements are manufactured separately, the sensing elements are then bonded to the CMOS sensing chips 105 so as to connect to the sensing electrodes 106. The sensing elements may be any known type of sensing element such as, for example, capacitive sensors, bio-field sensors, heat sensors, pyroelectric-based infrared sensors, gas sensors based on variable-resistance metal oxides, or another electrical, magnetic, or optical sensor. In one embodiment, the sensing elements are capacitive sensors, and the device 101 additionally includes an insulating layer on top of the sensing electrodes 106. In one embodiment, sensing electrodes 106 in different regions of the device 101 may be connected to varying types of sensing elements. The sensing elements may also be used for actuation, as described below in combination with the actuation signals. In this way, different regions of the device 101 may be operable to sense various types of signals and provide various types of actuation.

Sensed signals received by the sensing electrodes 106 from the sensing elements are transmitted to the processing chip 109 by activating the appropriate vertical wire 104. The sensed signals may be transmitted to the processing chip 109 along the horizontal wires 103 and/or any sensing chips 105 that lay on the path to the processing chip 109. For example, a sensed signal sensed at a sensing electrode 106 located on CMOS sensing chip $105_{1,1}$ is selected by activating the appropriate vertical wire 104 (using CMOS decoder $110_{1,1}$ as described below), and the selected sensed signal may be sent to the processing chip 109 via a horizontal wire 103 and CMOS sensing chips $105_{1,n}$ or one or more CMOS sensing chips connected to the horizontal wire, but not shown.

The sensed signal is the output of a sensing element that is connected to (accessed by) the sensing electrode 106. The sensed signals may be many types of signals depending on the types of sensing elements. In one embodiment, the sensed signal may indicate a magnitude. For example, the sensed signal may be a voltage that proportionally represents the capacitance or the resistance of the sensing element. For capacitance-based sensing elements (such as proximity detectors, touch screens, or pyroelectric-based infrared detectors), the capacitance changes in response to the sensed event, and the capacitance may then be converted to a current or voltage signal. The sensed signal may be this current or voltage. In another embodiment, the sensed signal may indicate a binary yes/no or high/low based on whether the sensed magnitude is higher than a threshold value.

In one embodiment, the sensing electrode 106 may receive the sensed signal from a sensing element and transmit the sensed signal to the processing chip 109 via the sensing chip 105. In another embodiment, the sensing electrode 106 may receive the sensed signal from a sensing element, the sensing chip 105 may process the sensed signal received by the sensing electrode 106, and a processed sensed signal may be transmitted to the processing chip 109. In one embodiment, the sensing electrode 106 may receive a magnitude from the sensing electrode, and the sensing chip 105 may determine if the magnitude is greater than or less than a threshold. The sensing chip 105 may then transmit a binary high/low signal indicating whether or not the magnitude was greater or less than a threshold.

The time duration of the sensed signal can range from a few microseconds to a few milliseconds based on the types of sensing elements used and the desired applications. As an example, for touch screens a time duration of a few milliseconds is acceptable, whereas for infrared sensors much shorter time durations may be preferable. Other variations are possible as well. In some embodiments, the sensing elements may be sensing constantly. In other embodiments, the sensing elements may be triggered to begin sensing when desired or needed.

Actuation signals sent to the sensing elements by the sensing electrodes 106 are transmitted from the processing chip 109 to the sensing electrodes 106 via the horizontal wires 103 and/or sensing chips 105. For example, an actuation signal could follow the path described above with respect to the sensed signal, but in reverse.

The actuation signal is sent from the sensing electrode 106 to a connected sensing element. The actuation signal may be, for example, a voltage. In one embodiment, the sensing element may comprise a microcantilever whose position may be modified according to the received voltage. As another example, the sensing element may be a pixel on a display that is controlled by the voltage. In another embodiment, the actuation signal may be a current pulse used to stimulate a neuron. As another example, the actuation signal may be a current used to heat a heating element or turn on a light emitting diode (LED). The time duration of the actuation signals may be independent of the time duration of the sensing signals.

Actuation and sensing are two distinct aspects of the invention, and as such, in some embodiments, a given sensing electrode 106 may be used for only one or the other. As examples, in an embodiment involving a display, the display may comprise only electrodes 106 used for actuation, whereas in an embodiment used for a nerve tissue interface, the electrodes 106 may be used for both sensing and actuation. In some embodiments, the sensing and actuation signals may be transmitted using separate, but parallel, horizontal wires.

Each sensing electrode 106 is positioned on the substrate 101 at an intersection of a given horizontal wire 103 and vertical wire 104. Additionally, each row of sensing electrodes 106 is connected to a common horizontal wire 103, and each column of sensing electrodes 106 is connected to a common vertical wire 104.

In one embodiment, the sensing electrodes 106 are positioned on a top surface of each CMOS sensing chip 105, and the plurality of CMOS sensing chips 105 are positioned on the substrate 102 such that the top surfaces of the CMOS sensing chips 105 are exposed. Alternatively, the sensing electrodes 106 may be positioned on a bottom surface of each CMOS sensing chip 105. Still, as another example, some sensing electrodes 106 may be positioned on a top surface of CMOS sensing chips 105, while some sensing electrodes 106 may be positioned on a bottom surface of CMOS sensing chips 105. In another embodiment, the plurality of CMOS sensing chips 105 are positioned on one side of the substrate 102, the sensing electrodes 106 are positioned on an opposite side of the substrate 102, and the CMOS sensing chips 105 are connected to the sensing electrodes 106 through vias in the substrate 102.

In one embodiment, the CMOS sensing chips 105 are operable to process sensed signals received from the sensing elements and to transmit the processed received sensed signals to the processing chip 109 via the horizontal wires 103. As the CMOS sensing chips 105 are manufactured in the well-known CMOS technology, the CMOS sensing chips can take advantage of the many known uses of CMOS electronics.

Device 101 is shown further comprising the plurality of CMOS selection transistors 107 and CMOS decoders 110, both included in the processing chip 109. The plurality of CMOS decoders 110 are connected to vertical wires 104. Each CMOS decoder 110 is connected to a respective vertical wire 104 and is operable to activate the vertical wire 104 and in turn any of the sensing electrodes 106 in the column of sensing electrodes 106 connected to the vertical wire 104. As an example, CMOS decoder $110_{1,1}$ is operable to activate any of sensing electrodes $106_{1,1,a}$, $106_{1,1,c}$, $106_{n,1,a}$, and $106_{n,1,c}$, as well as any other sensing electrodes 106 connected to the same vertical wire 104 as the CMOS decoder $110_{1,1}$.

The plurality of CMOS selection transistors 107 are connected to the horizontal wires 103. Each CMOS selection transistor 107 is connected to a respective horizontal wire 103 and is operable to select any one of the sensing electrodes 106 in the row of sensing electrodes 106 connected to the horizontal wire 103. As an example, CMOS selection transistor $107_1$ is operable to select any of sensing electrodes $106_{1,1,a}$, $106_{1,1,b}$, $106_{1,n,a}$, and $106_{1,n,b}$, as well as any other sensing electrodes 106 connected to the same horizontal wire 103 as the CMOS selection transistor $107_1$.

When a vertical wire 104 is activated by a CMOS decoder 110, the activated vertical wire 104 controls connection of each sensing electrode 106 in the column of sensing electrodes 106 connected to the vertical wire 103 to its respective horizontal wire 103. The selection transistor 107 may then select one of the horizontal wires 103, such that a sensed signal may be received from the sensing electrode 106 that is located at the intersection of the activated vertical wire 104 and the selected horizontal wire 103. As an example, if CMOS decoder $110_{1,1}$ and CMOS selection transistor $107_1$ are activated, a sensed signal may be received from sensing electrode $106_{1,1,a}$.

Device 101 is shown further comprising the plurality of CMOS signal drivers 108. The CMOS signal drivers 108 are included on the CMOS sensing chips 105 and in the processing chip 109. Each of the horizontal wires 103 is connected to a CMOS signal driver 108 on a CMOS sensing chip 105, and each of the vertical wires 104 is connected to one of the CMOS signal drivers 108 in the processing chip 109. Each CMOS signal driver 108 connected to a horizontal wire 103 is operable to amplify signals transmitted between adjacent CMOS sensing chips 105 via the horizontal wires 103. These signals may include sensed and actuation signals sent between CMOS sensing chips 105 and the processing chip 109 via one or more CMOS sensing chips 105. In one embodiment, each CMOS signal driver 108 connected to a horizontal wire 103 is further operable to receive, amplify, and transmit digital select signals sent from the processing chip 109. In one embodiment, each CMOS signal driver 108 comprises an analog buffer for the sensed and actuation signals.

Device 101 is shown further including the processing chip 109. In one embodiment, however, the processing chip 109 may not be located on the device 101, but may instead be printed onto a separate flexible sheet connected to the device 101. This separate flexible sheet may also include the array of horizontal wires 103 and vertical wires 104. In another embodiment, the processing chip 109 is printed on a separate printed circuit board and connected to the array of horizontal wires 103 and vertical wires 104. In any case, the processing chip 109 is operable to receive sensed signals from and send actuation signals to the sensing electrodes 106 via the horizontal wires 103 and one or more CMOS sensing chips 105.

Additionally, the processing chip 109 is operable to control operation of the CMOS selection transistors 107 and CMOS decoders 110. In particular, the processing chip 109 may send signals to the CMOS decoders 110 to activate a column of sensing elements, and to the CMOS selection transistors 107 to activate a row of sensing elements in order to receive sensed signals from particular sensing electrodes 106, as described above.

Further, the processing chip 109 provides power to each CMOS sensing chip 105. In one embodiment, the processing chip 109 and the CMOS sensing chips 105 are designed using different CMOS technologies. For example, the processing chip 109 may be designed in a 130 nm or smaller CMOS technology, while the CMOS sensing chips 105 may be designed in an older CMOS process such as a 350 nm or 1 μm CMOS technology.

Figure 2A:
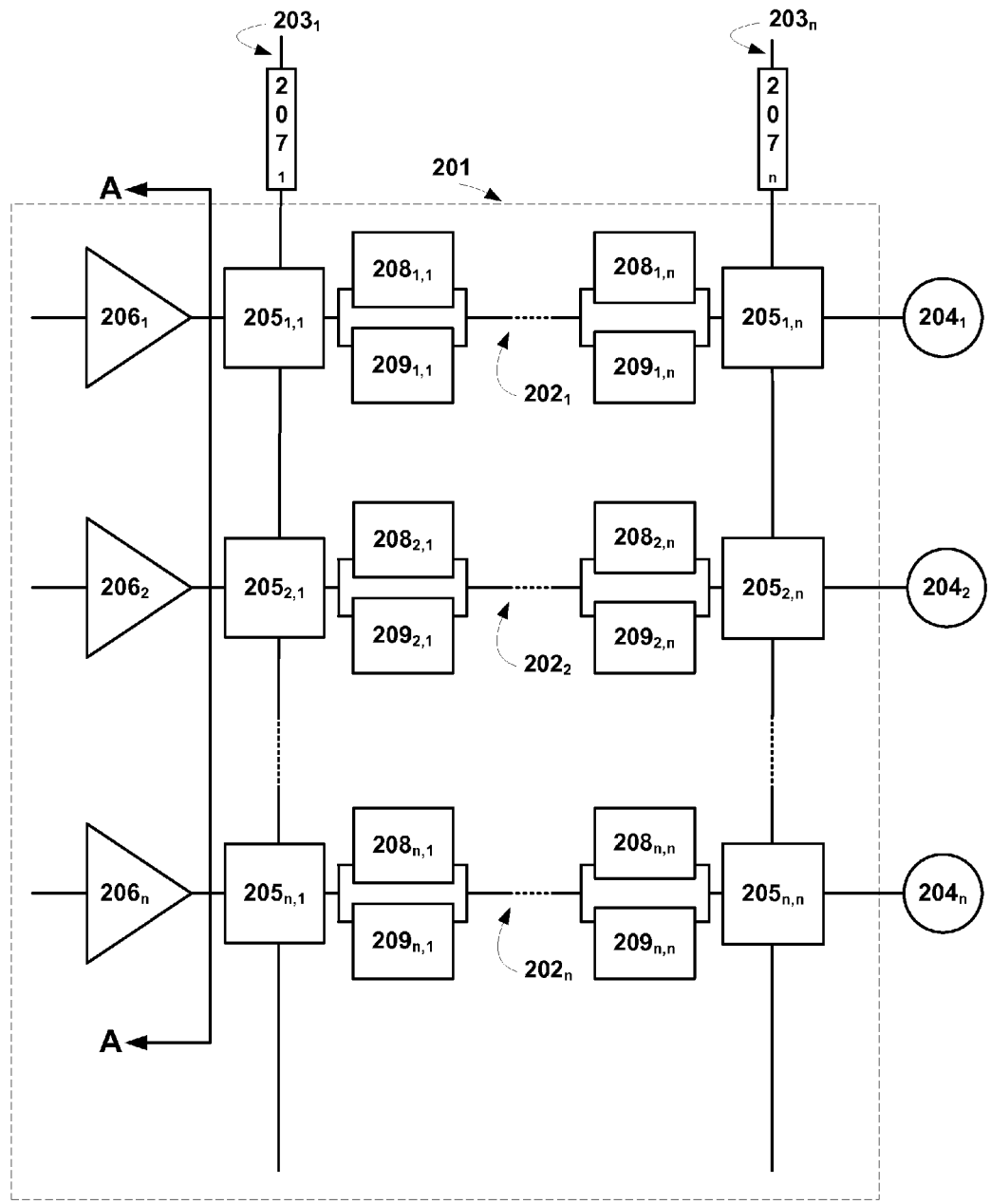
FIG. 2a depicts an example complementary-metal-oxide-semiconductor (CMOS) sensing chip.

FIG. 2a depicts an example CMOS sensing chip 201, bounded by the dotted line. The CMOS sensing chip 201 is shown comprising an array of horizontal wires 202 and vertical wires 203. The array of horizontal wires 202 and vertical wires 203 may be positioned on a first plane. The CMOS sensing chip 201 is shown further comprising a plurality of CMOS sensing electrodes 205, and a plurality of CMOS signal drivers 206 connected to the horizontal wires 202. The CMOS sensing electrodes 205, and CMOS signal drivers 206 may be positioned on a second plane. The first plane and the second plane are shown parallel to one another. The first plane and the second plane may, in some examples, be the same plane. Outside the CMOS sensing chip 201 is shown a plurality of CMOS decoders 207 and a plurality of CMOS selection transistors 204. Each of the CMOS decoders 207 is connected to a respective vertical wire, and each of the CMOS selection transistors 204 is connected to a respective horizontal wire. The CMOS decoders 207 and the CMOS transistors 204 may be included in a processing chip (not shown). The processing chip may further include other CMOS signal drivers 206 connected to the vertical wires 203.

The CMOS sensing chip 201 may be one of a plurality of CMOS sensing chips located on a sensing and actuation device, such as, for example, the sensing and actuation device 101 described in FIG. 1. The CMOS sensing chip 201 can be interconnected by a wiring mesh with other similar CMOS sensing chips in order to form a matrix of CMOS sensing chips such as that shown on the device 101 of FIG. 1. An interconnected CMOS sensing chip can receive signals from other CMOS sensing chips. Because each CMOS sensing chip 201 comprises active electronics, the received signal can be restored and/or preserved before being transmitting to another CMOS sensing chip or a processing chip. In this way, signals from the CMOS sensing chips 201 may be transmitted over large distances with little or no degradation.

CMOS sensing chip 201 is shown comprising the plurality of sensing electrodes 205. Each sensing electrode 205 is connected to a sensing element and is operable to receive sensed signals from and send actuation signals to the sensing element. Each sensing electrode 205 may then transmit the sensed signals to a processing chip. Each sensing electrode 205 is positioned at an intersection of the horizontal wires 202 and vertical wires 203. This positioning of the sensing electrodes 205 forms rows and columns of sensing electrodes 205. A row of sensing electrodes 205 is connected by a common horizontal wire 202. As an example, the top row shown in FIG. 2a includes sensing electrode $205_{1,1}$ and sensing electrode $205_{1,n}$. Sensing electrode $205_{1,1}$ and sensing electrode $205_{1,n}$ share a common horizontal wire $202_1$. While FIG. 2a shows these two sensing electrodes on the top row, any number of sensing electrodes may be present between sensing electrode $205_{1,1}$ and sensing electrode $205_{1,n}$, as illustrated by the ellipses on the horizontal wire $202_1$.

Similarly, a column of sensing electrodes 205 is connected by a common vertical wire 203. As an example, the leftmost column shown in FIG. 2a includes sensing electrode $205_{1,1}$, sensing electrode $205_{2,1}$, and sensing electrode $205_{n,1}$. Sensing electrodes $205_{1,1}$, sensing electrode $205_{2,1}$, and sensing electrode $205_{n,1}$ share a common vertical wire $203_1$. While FIG. 2a shows these three sensing electrodes in the leftmost column, any number of sensing electrodes may be present between sensing electrode $205_{2,1}$ and sensing electrode $205_{n,1}$, as illustrated by the ellipses on the vertical wire $203_1$.

In general, any number of sensing electrodes 205 may be present in the CMOS sensing chip 201. The sensing electrode in the upper left hand corner of FIG. 2a is denoted $205_{1,1}$ to indicate that the sensing electrode is in the first row and first column of the matrix of sensing electrodes on the CMOS sensing chip 201. Similarly, the sensing electrode in the lower right hand corner of FIG. 2a is denoted $205_{n,n}$ to indicate that that the sensing electrode is in the $n^{th}$ row and $n^{th}$ column of the matrix of sensing electrodes 205 on the CMOS sensing chip 201. Any number of rows and any number of columns may make up the matrix of sensing electrodes 205 on the CMOS sensing chip 201. Note that the matrix shown in FIG. 2a is a matrix of sensing electrodes 205, which differs from the matrix of CMOS sensing chips 105 shown in FIG. 1. Rather, each device 101, as shown in FIG. 1, may comprise a matrix of CMOS sensing chips 105. Further, each CMOS sensing chip, such as, for example, CMOS sensing chip 201 as shown in FIG. 2a, may comprise a matrix of sensing electrodes 205. In this manner, a high density of sensing electrodes may be present on a single device.

The CMOS sensing chip 201 is shown further comprising the plurality of CMOS signal drivers 206. Each of the horizontal wires 202 is connected to one of the CMOS signal drivers 206. Each CMOS signal driver 206 is operable to receive, amplify, and transmit signals via the horizontal wires 202. These signals may include sensed signals, actuation signals, and/or digital select signals. In one embodiment, the CMOS sensing chip 201 is part of a matrix of CMOS sensing chips and the CMOS signal drivers 206 are operable to receive signals from other CMOS sensing chips or a processing chip, amplify the signals, and transmit the amplified received signals to another CMOS sensing chip or the processing chip.

The CMOS sensing chip 201 may further comprise sensing electronics 208 and actuation electronics 209. The sensing electronics 208 are operable to transmit sensed signals from the sensing electrodes 205 to the horizontal wires 202. The actuation electronics 209 are operable to transmit actuation signals from the horizontal wires 202 to the sensing electrodes 205. In one embodiment, each sensing electrode 205 is connected to its own set of sensing electronics 208 and actuation electronics 209. For example, FIG. 2a depicts sensing electrode $205_{1,1}$ connected to its own set of sensing electronics $208_{1,1}$ and actuation electronics $209_{1,1}$. In one embodiment, the sensing electronics 208 comprise a filter, a programmable gain amplifier, and a line driver. In one embodiment, the actuation electronics 209 comprise a line driver.

The CMOS sensing chip 201 may further comprise a processing chip, of which only the CMOS selection transistors 204 and the CMOS decoders 207 are shown. The processing chip may be operable to receive sensed signals from and send actuation signals to the sensing electrodes 205 via the horizontal wires 202. The processing chip may be operable to control operation of the CMOS selection transistors 204 and the CMOS decoders 207. Additionally, the processing chip may provide power to the sensing chip 201.

Each CMOS selection transistor 204 is shown connected to a respective horizontal wire 202. As an example, CMOS selection transistor $204_1$ is shown connected to horizontal wire $202_1$. Each CMOS selection transistor 204 is operable to select a row of sensing electrodes 205 connected by the respective horizontal wire 202. As an example, CMOS selection transistor $204_1$ is operable to select the row of sensing electrodes connected to horizontal wire $202_1$ (including sensing electrode $205_{1,1}$ and sensing electrode $205_{1,n}$).

Similarly, each CMOS decoder 207 is shown connected to a respective vertical wire 203. As an example, CMOS decoder $207_1$ is shown connected to vertical wire $203_1$. Each CMOS decoder 207 is operable to activate a column of sensing electrodes 205 connected by the respective vertical wire 203 by controlling connection of the horizontal wire 202 to the vertical wires 203. As an example, CMOS decoder $207_1$ is operable to activate the column of sensing electrodes connected to vertical wire 2031 (including sensing electrode $205_{1,1}$, sensing electrode $205_{2,1}$, and sensing electrode $205_{n,a}$). When vertical wire $203_1$ is activated, the CMOS decoder $207_1$ controls connection of each of the sensing electrodes in the column connected to the vertical wire $203_1$ (that is, $205_{1,1}$, $205_{2,1}$, and $205_n$) to its respective horizontal wire (that is, $202_1$, $202_2$, and $202_n$, respectively).

When a vertical wire 203 is activated, and a horizontal wire 202 is selected by a CMOS selection transistor 204, either a sensed signal may be sent to, or an actuation signal may be received from, the sensing electrode 205 located at the intersection of the horizontal wire 202 and the vertical wire 203. As an example, when vertical wire $203_1$ is activated, and horizontal wire $202_1$ is selected by CMOS selection transistor $204_1$, either a sensed signal may be sent to, or an actuation signal may be received from, the sensing electrode $205_{1,1}$.

In one embodiment, a CMOS decoder 207 may activate a column of sensing electrodes 205. One or more CMOS selection transistors 204 may then select one or more rows in response to receiving a digital select signal. In one embodiment, the CMOS selection transistors 204 are controlled by a processing chip. The processing chip may transmit a digital select signal to activate a CMOS selection transistor 204. This digital select signal may be, for example, a voltage that is greater than the turn-on voltage of the CMOS selection transistor.

For example, the processing chip may transmit a digital select signal to turn on CMOS selection transistor $204_1$. When the CMOS selection transistor $204_1$ is turned on, the sensing electrodes $205_{1,1}$-$205_{1,n}$ connected to the horizontal wire $202_1$ are selected, and a sensed signal from one of the sensing electrodes is transmitted to the processing chip. In one embodiment, the processing chip may determine which sensing electrode of the sensing electrodes $205_{1,1}$-$205_{1,n}$ transmitted the sensed signal based on which vertical wire is activated. The processing chip thus knows which vertical wire was activated ($203_1$) as well as which horizontal wire ($202_1$) was selected and used to transmit the sensed signal. With this information, the processing chip may determine that the sensed signal was sent from the sensing electrode located at the intersection of horizontal wire $202_1$ and vertical wire $203_1$, namely sensing electrode $205_{1,1}$.

Figure 2B:
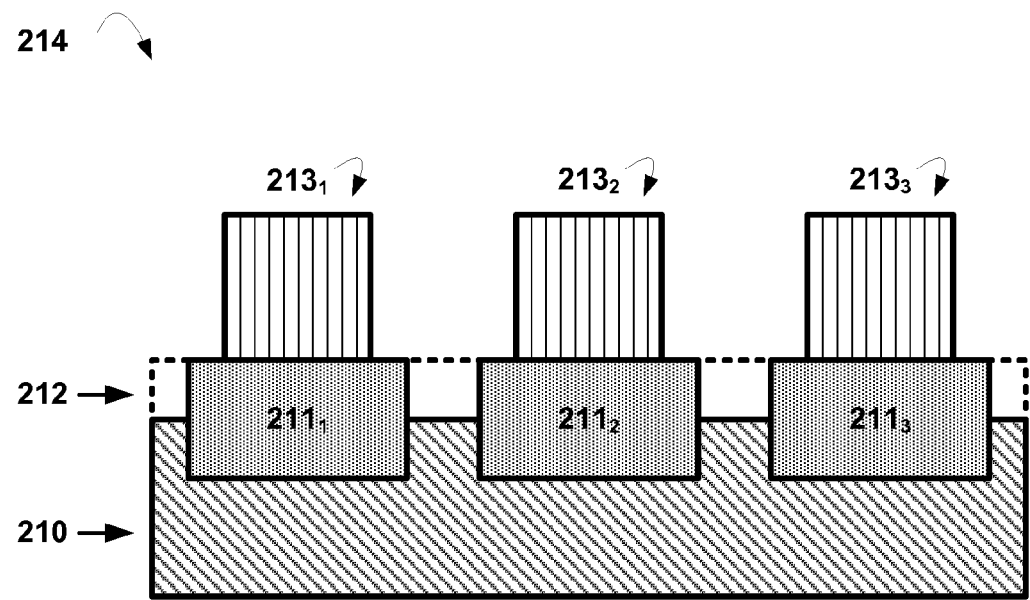
FIG. 2b depicts a side view of an example device for sensing and actuation.

FIG. 2b depicts a side view of an example device for sensing and actuation. The side view depicted in FIG. 2b may be a side view of the CMOS sensing chip shown in FIG. 2a cut along the line A-A as shown in FIG. 2a. Device 214 is shown comprising a substrate 210, sensing electrodes $211_1$, $211_2$, and $211_3$, an insulating layer 212, and sensing elements $213_1$, $213_2$, and $213_3$. The sensing electrodes $211_1$, $211_2$, and $211_3$ are shown embedded in the substrate 210. The sensing electrodes $211_1$, $211_2$, and $211_3$, are part of one or more sensing chips, such as CMOS sensing chip 201 depicted in FIG. 2a.

Sensing elements $213_1$, $213_2$, and $213_3$ may be many types of sensing elements, such as capacitive, bio-field, electrical, magnetic, or optical sensors. Each of the sensing elements $213_1$, $213_2$, and $213_3$ is connected to one of sensing electrodes $211_1$, $211_2$, and $211_3$. For example, FIG. 2b shows sensing element $213_1$ connected to sensing electrode $211_1$. Sensing electrode $211_1$ receives a sensed signal from sensing element $213_1$. In one embodiment, sensing electrode $211_1$ transmits the sensed signal to a processing chip, such as processing chip 109 depicted in FIG. 1. In one embodiment, the sensed signal may be processed by a sensing chip before being transmitted to the processing chip.

Similarly, the sensing electrodes $211_1$, $211_2$, and $211_3$ may receive actuation signals from a processing chip and transmit the actuation signals to the sensing elements $213_1$, $213_2$, and $213_3$. For example, sensing electrode $211_1$ transmits an actuation signal to sensing element $213_1$.

In some embodiments, the sensing elements $213_1$, $213_2$, and $213_3$ may be capacitive sensors. In this example, there may be an insulating layer 212 between the sensing electrodes $211_1$, $211_2$, and $211_3$ and the sensing elements $213_1$, $213_2$, and $213_3$. In other embodiments, the insulating layer 212 may not be present.

Figure 3:
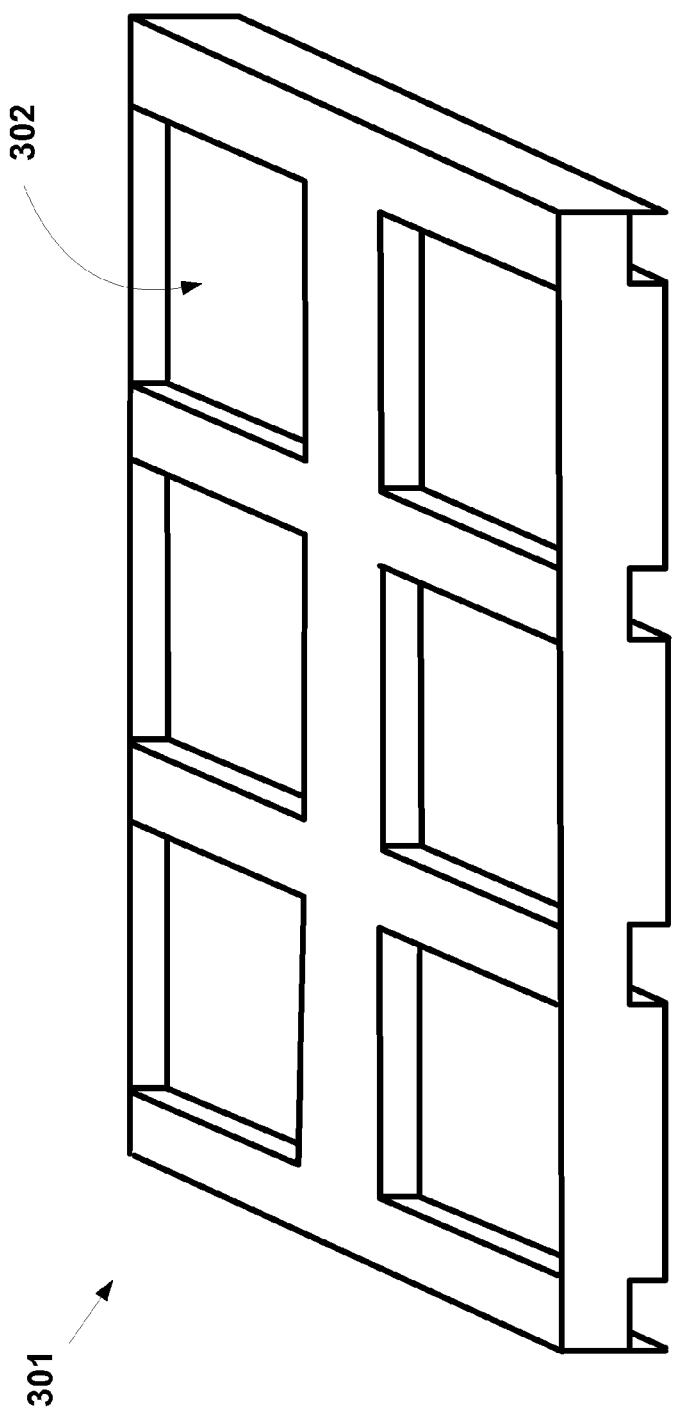
FIG. 3 depicts an example substrate for use in a device for sensing and actuation.

FIG. 3 depicts an example substrate 301 for use in a device for sensing and actuation. The substrate 301 comprises a plurality of cavities 302. In one embodiment, CMOS sensing chips, such as those shown in FIGS. 1 and 2, may be positioned on the substrate 301 within the cavities 302 of the substrate 301. In one embodiment, an array of horizontal and vertical wires, such as those shown in FIGS. 1 and 2, may be included in the substrate 301. In another embodiment, however, the array of horizontal wires and vertical wires may be printed onto a flexible sheet. Such a flexible sheet is further described in connection with FIG. 4.

Figure 4:
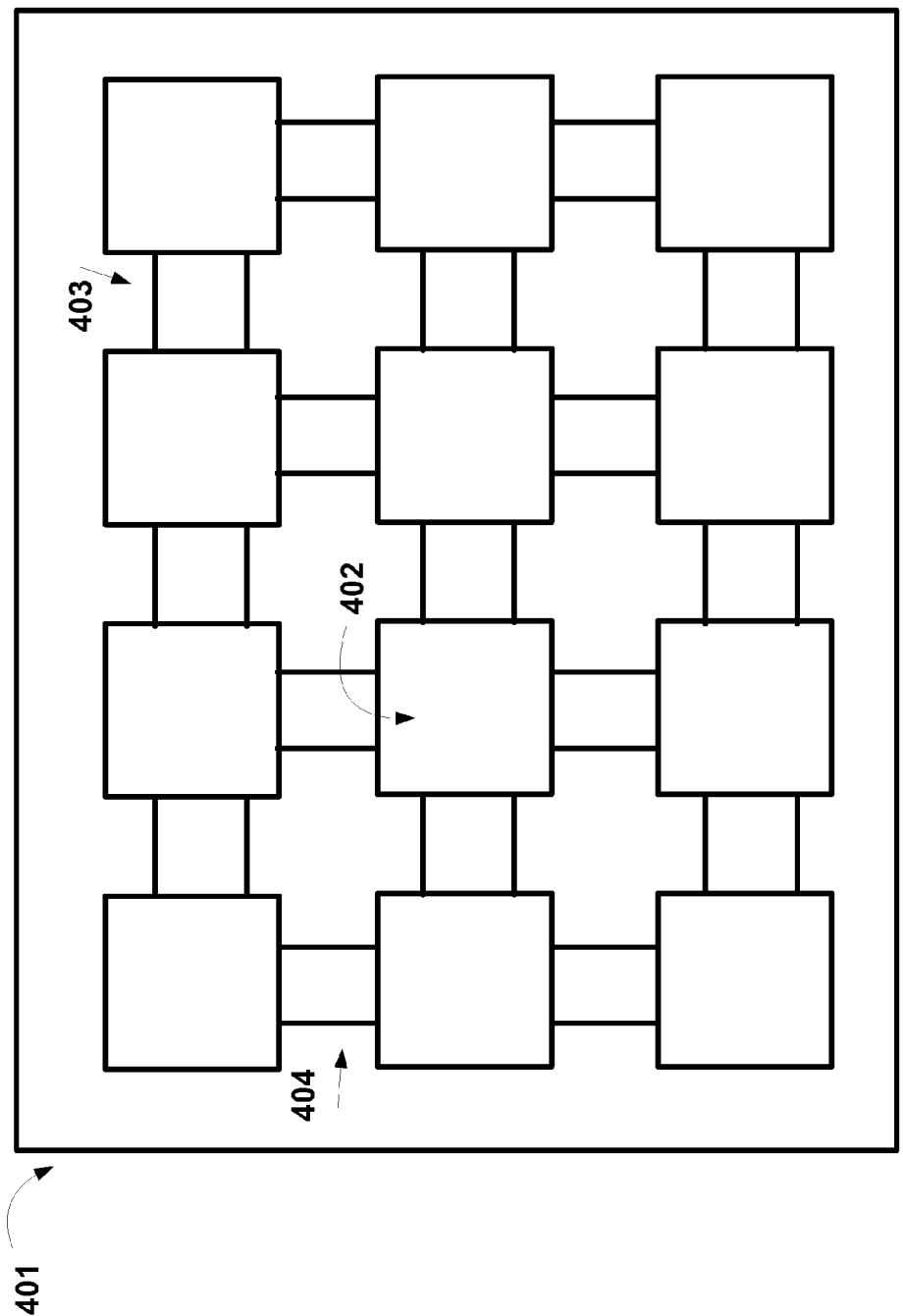
FIG. 4 depicts an example wiring scheme for use in a device for sensing and actuation.

FIG. 4 depicts an example wiring scheme for use in a device for sensing and actuation. FIG. 4 shows a separate flexible sheet 401. The flexible sheet 401 includes an array of horizontal wires 403 and vertical wires 404. The array of wires 403 and 404 may be printed using a printer such as the Dimatix printer manufactured by FUJIFILM. This printer prints material onto the flexible surface in much the same way an inkjet printer prints ink onto paper. If such a printer is used, post-processing may be employed, such as mild heating or cooling to ensure that the material congeals substantially homogenously.

The separate flexible sheet 401 is shown further including openings 402 through which CMOS sensing chips, such as those shown in FIGS. 1 and 2, may be positioned. In one embodiment, the flexible sheet 401 may be attached to a substrate, such as that shown in FIG. 1, so that the openings align with CMOS sensing chips positioned on the substrate and expose the CMOS sensing chips. In one embodiment, the separate flexible sheet 401 further includes a processing chip, such as that described in FIG. 1.

The flexible sheet 401 may be placed either on the top or the bottom of the substrate. The CMOS sensing chips may be connected to the flexible sheet 401 using any combination technique, such as bond wires and/or flip-chip bonding.

Figure 5:
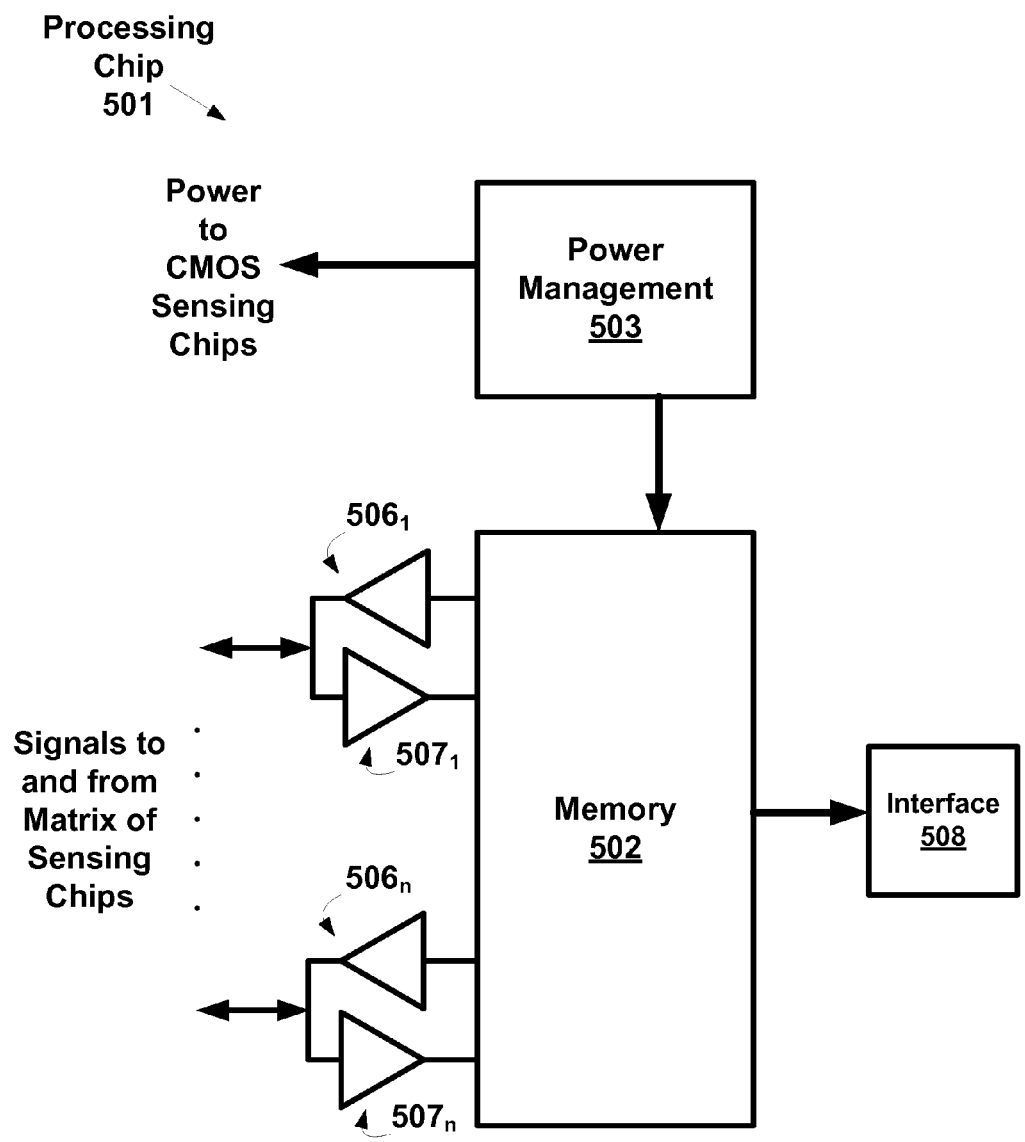
FIG. 5 depicts an example processing chip for use in a device for sensing and actuation.

FIG. 5 depicts an example processing chip 501 for use in a device for sensing and actuation. The processing chip 501 is shown comprising an embedded processing/memory 502 and power management/harvesting 503. The processing chip 501 may also comprise CMOS decoders and CMOS selection transistors as described above (not shown). The processing chip 501 is operable to provide power to a plurality of CMOS sensing chips, such as those shown in FIG. 1.

Additionally, the processing chip 501 is operable to receive signals from and send signals to the matrix of CMOS sensing chips. The processing chip 501 may receive sensed signals, and the processing chip 501 may send actuation signals and digital select signals. The processing chip 501 may be manufactured in a standard CMOS process. The processing chip 501 need not be manufactured in the same CMOS technology as the CMOS sensing chips.

The processing chip 501 may also comprise analog to digital converters (ADCs) 506₁ and 506ₙ as well as digital to analog converters (DACs) 507₁ and 507ₙ. In one embodiment, in a device such as that shown in FIG. 1, the vertical wires carry analog signals while the horizontal signals carry digital signals. In the processing chip 501 comprising ADCs and DACs, the analog signals carried by the vertical wires may be converted back and forth between analog and digital signals such that the vertical wires carry digital signals. In one embodiment, there may be one ADC and one DAC for each vertical wire in an array of vertical and horizontal wires on the device.

In some embodiments, the processing chip 501 further comprises interface electronics 508 for interfacing to other components. These interface electronics 508 may enable a connection that is either wired or wireless.

Figure 6:
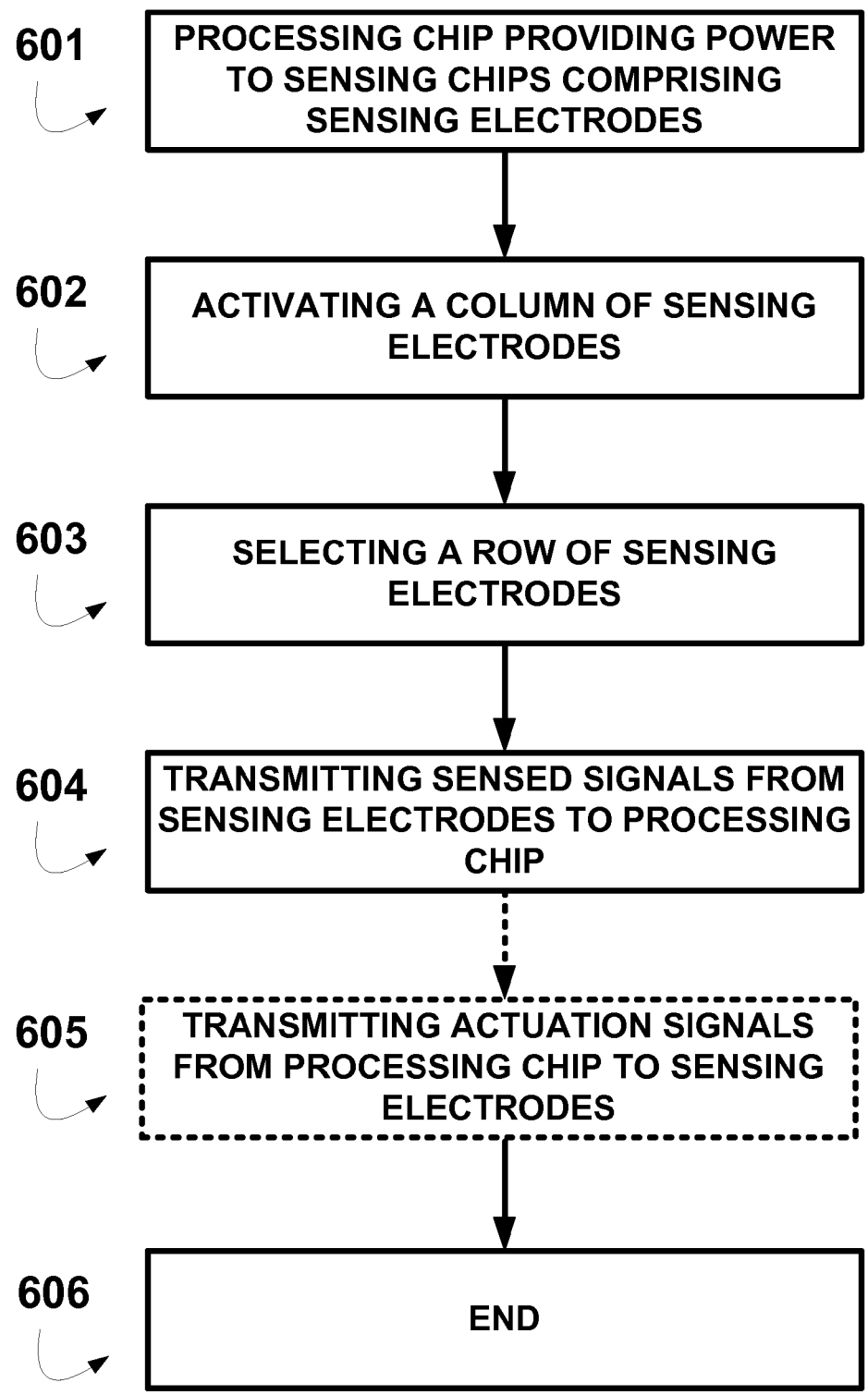
FIG. 6 is a flow chart depicting example steps for sensing and actuating using a matrix of sensing chips.

FIG. 6 is a flow chart depicting example steps for sensing and actuating using a matrix of sensing chips. It should be understood that the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable storage medium, for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

Initially, at block 601, a processing chip provides power to a plurality of sensing chips. The power is transmitted to each sensing chip on a path comprising horizontal wires, vertical wires, and sensing chips. Each sensing chip comprises a plurality of CMOS selection transistors, a plurality of CMOS decoders, and a plurality of sensing electrodes arranged in a matrix of columns and rows along the horizontal and vertical wires.

At block 602, a CMOS decoder selectively activates a column of sensing electrodes by sending an activation signal to the vertical wire corresponding to the column. When the vertical wire is activated by a CMOS decoder, the activated vertical wire controls connection of each sensing electrode in the column of sensing electrodes connected to the vertical wire to its respective horizontal wire.

At block 603, one or more CMOS selection transistors receives a digital select signal. The digital select signal may be received from the processing chip. In one embodiment, the digital select signal is a voltage greater than the turn-on voltage of a particular CMOS selection transistor. In one embodiment, such as that shown in FIG. 1, each CMOS selection transistor is connected to a horizontal wire, and connected to each horizontal wire is a row of sensing electrodes. When the digital select signal is received by the one or more CMOS selection transistors, one or more rows of sensing electrodes connected to one or more selected horizontal wire may be selected. Thus one or more rows of sensing electrodes may be selected according to the digital select signal. In another embodiment, the CMOS selection transistors and wires may be positioned differently, such that providing the digital select signal to the CMOS selection transistor activates a region, a column, or other defined area of the matrix of sensing electrodes.

Some sensing electrodes will then be activated. A sensing electrode is said to be activated if it lies on the intersection of an activated column and a selected row of sensing electrodes.

At block 604, the sensed signals are transmitted from the activated sensing electrodes to the processing chip via the horizontal wires. Each horizontal wire carries the sensed signal from a respective sensing electrode on the activated column of sensing electrodes. The sensed signals may be amplified during transmission between the sensing electrode and the processing chip.

Block 605 may be performed either in addition to or instead of block 604. At block 605, the actuation signals are transmitted from the processing chip to the sensing electrodes in the row of sensing electrodes via the horizontal wires. Each horizontal wire carries the actuation signal to a respective sensing electrode on the column of sensing electrodes. The actuation signals are amplified during transmission between the processing chip and the sensing electrode.

Both the sensed signals and the actuation signals may follow a path comprising other CMOS sensing chips. The CMOS sensing chips are equipped with electronics to restore and amplify the signals.

In one embodiment, the method depicted in FIG. 6 is performed repeatedly. The CMOS selection transistor may selectively activate subsequent columns of the matrix of sensing electrodes in an iterative manner so as to generate a scan of the matrix.

Figure 7:
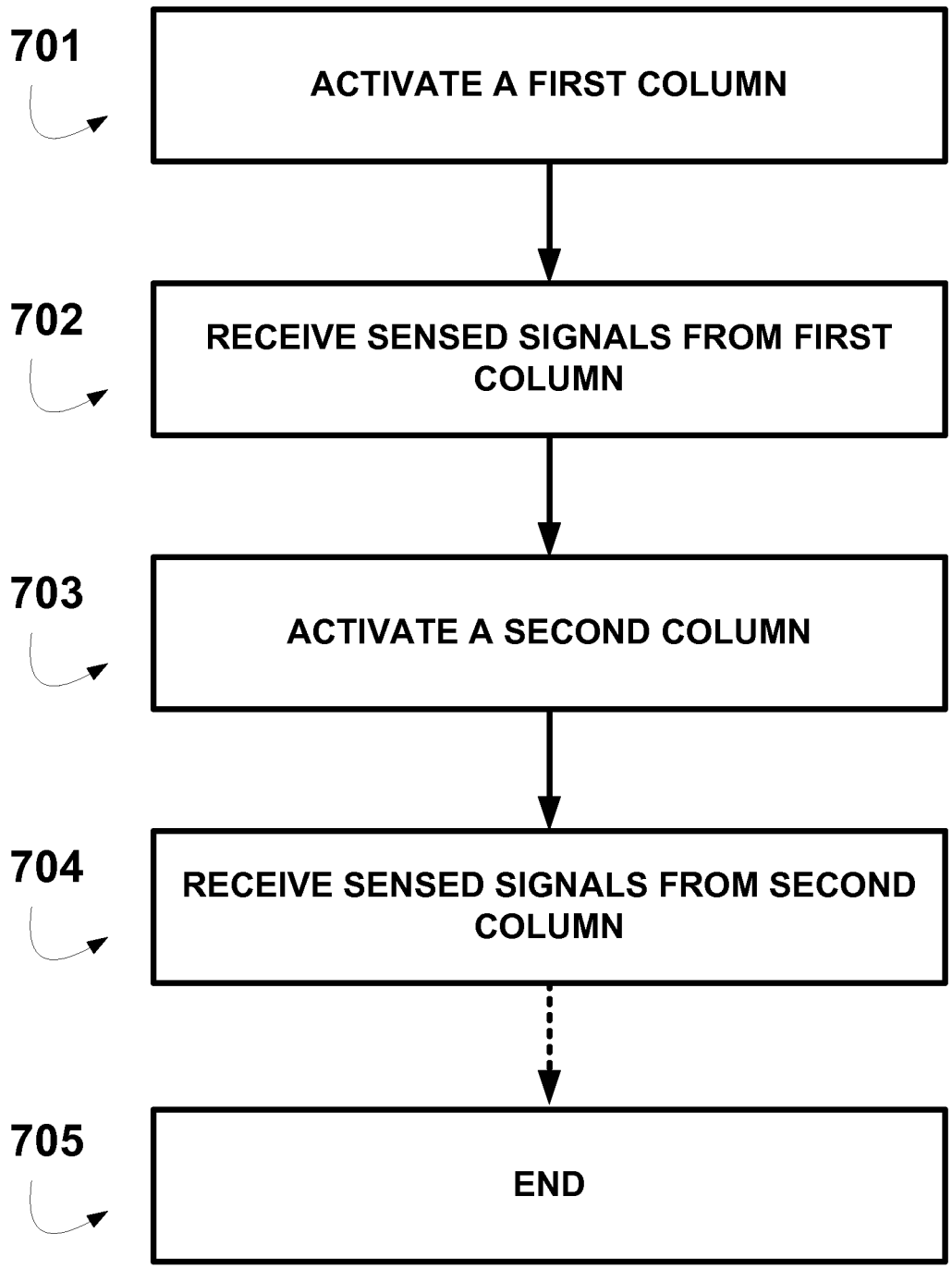
FIG. 7 is a flow chart depicting example steps for sensing a matrix of sensing electrodes.

FIG. 7 is a flow chart depicting a method for sensing a matrix of sensing electrodes. The dotted arrow between block 704 and 705 indicates that many steps similar to those depicted in blocks 701-704 may be repeated for any desired number of times.

At block 701, a first column of sensing electrodes is activated. In one embodiment, this may be the leftmost column of a matrix of sensing electrodes, such as that depicted in FIG. 1. In one embodiment, a first region of sensing electrodes may be activated. The region may be one column. The region may also be multiple columns, every other row, or another region such as the upper-left quarter of the matrix, or the middle third of the matrix, etc. The layout of horizontal wires, vertical wires, and CMOS selection transistors may vary from embodiment to embodiment, depending on which areas are to be isolated for receiving sensed signals.

At block 702, sensed signals are received from the first column via the horizontal wires. In some embodiments, the sensed signals are received by a processing chip. The processing chip is able to discern which sensing electrode is transmitting the sensed signal by determining which vertical wire is activated and which horizontal wire was used to transmit the sensed signal. In some embodiments, the sensed signal is a magnitude, such as a capacitance or a voltage. In other embodiments, the sensed signal may be a binary high/low signal.

At block 703, a second column of sensing electrodes is activated. Like the first row, the second row may be multiple columns or may instead be a region of sensing electrodes in the matrix. Again, the layout of horizontal wires, vertical wires, and CMOS selection transistors may vary from embodiment to embodiment, depending on which areas are to be isolated for receiving sensed signals.

At block 704, sensed signals are received from the second column. A processing chip may once again be able to discern which sensing electrode is transmitting the sensed signal by determining which vertical wire is activated and which horizontal wire was used to transmit the sensed signal.

Between block 704 and block 705, many more columns or regions may be activated and signals may be received from each of these columns or regions. In some embodiments, the method continues until sensed signals have been received from each sensing electrode in the matrix of sensing electrodes. The method may then be repeated. In one embodiment, if sensed signals cannot be detected from a particular region of sensing electrodes, then when the method is repeated this region of sensing electrodes is skipped. In some embodiments, the number of sensing electrodes sensed may be larger than the number of sensing electrodes actuated. Alternately, the number of sensing electrodes sensed may be smaller than the number of sensing electrodes actuated.

At block 705, the method is ended. The method may then be repeated, either immediately or at a later time. While the method depicted in FIG. 7 describes the processing chip receiving sensed signals from the sensing electrodes, the method may further include the processing chip transmitting actuation signals to the sensing electrodes. In such an embodiment, the processing chip may activate a column of sensing electrodes and then transmit an actuation signal to one or more of the sensing electrodes in the column of sensing electrodes via the horizontal wires. In some embodiments, a column of sensing electrodes may be activated, sensed signals may be received from the row of sensing electrodes, and while the column of sensing electrodes is still activated, actuation signals may be transmitted to the column of sensing electrodes. Other combinations of sensing and actuation by row or region of sensing electrodes are possible.

In the previously described embodiments, the processing chip has used a CMOS decoder connected to a vertical wire to activate a column of sensing electrodes that are each connected to the vertical wire and has discerned between the sensing electrodes by determining which horizontal wire was selected by a CMOS selection transistor and then used transmit the signal to or from the sensing electrode. In other embodiments, a CMOS decoder may be connected to a horizontal wire and may be used to activate a row of sensing electrodes that are each connected to the horizontal wire. In these embodiments, the processing chip may discern between the sensing electrodes by determining which vertical wire was used to transmit to or from the sensing electrode. Other embodiments are possible as well.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device comprising:
    a sensing chip comprising a plurality of sensing electrodes, each sensing electrode being connected to a sensing element and operable to receive sensed signals from the sensing element, and send actuation signals to the sensing element to control an output of the sensing element, wherein the plurality of sensing electrodes is arranged to form rows and columns of sensing electrodes;
    a plurality of decoders, each decoder being operable to activate a respective column of sensing electrodes;
    a plurality of selection transistors, each selection transistor being operable to select a respective row of sensing electrodes; and
    a processing chip configured to be in communication with the sensing chip, the plurality of decoders, and the plurality of selection transistors, the processing chip operable to:
        receive sensed signals from the sensing electrodes;
        send the actuation signals to the sensing electrodes, wherein each actuation signal includes a time duration, and the actuation signals are effective to cause the sensing elements to produce a stimulation external to the device based on the time duration;
        control the plurality of decoders to activate one or more columns of sensing electrodes;
        receive a digital select signal;
        control the plurality of selection transistors to select one or more rows of sensing electrodes according to the digital select signal.

2. The device of claim 1, wherein the sensing chip is positioned within cavities of a substrate.

3. The device of claim 2, further including an array of horizontal and vertical wires printed on the substrate.

4. The device of claim 3, wherein the array of horizontal and vertical wires is printed on a separate sheet, the separate sheet being attached to the substrate and including openings through which the sensing chip is positioned.

5. The device of claim 4, wherein the processing chip is printed on the separate sheet.

6. The device of claim 3, wherein the processing chip is on a separate printed circuit board (PCB) and connected to the array of horizontal and vertical wires.

7. The device of claim 1, wherein the sensing electrodes are positioned on a top surface of each sensing chip, and wherein the sensing chip is positioned on the substrate such that a top surface of the sensing chip is exposed.

8. The device of claim 1, wherein the sensing chips and the processing chip are designed using different complementary-metal-oxide-semiconductor (CMOS) technologies.

9. The device of claim 1, wherein the sensing chip is further operable to process the received sensed signals and transmit the processed received sensed signals to the processing chip.

10. The device of claim 1, further comprising an insulating layer on top of the sensing electrodes.

11. The device of claim 10, wherein the sensing elements are capacitance sensors.

12. A sensing chip comprising:
    a plurality of sensing electrodes, each sensing electrode being connected to a sensing element and operable to receive sensed signals from the sensing element and send actuation signals to the sensing element to control an output of the sensing element, wherein the plurality of sensing electrodes are arranged to form rows and columns of sensing electrodes;
    a plurality of signal drivers, each signal driver being operable to receive, amplify, and transmit signals between the sensing chip and a processing chip, wherein the processing chip is configured to be in communication with the sensing chip, wherein the signals comprise sensed signals and actuation signals;
    a plurality of decoders, each decoder being operable to activate a respective column of sensing electrodes;
    a plurality of selection transistors, each selection transistor being operable to select a respective row of sensing electrodes; and
    the processing chip being operable to:
        receive sensed signals from the sensing electrodes;
        send the actuation signals to the sensing electrodes, wherein each actuation signal includes a time duration, and the actuation signals are effective to cause the sensing elements to produce a stimulation external to the device based on the time duration;
        control the plurality of decoders to activate one or more columns of sensing electrodes;
        receive a digital select signal;
        control the plurality of selection transistors to select one or more rows of sensing electrodes according to the digital select signal.

13. The sensing chip of claim 12, further comprising:
    sensing electronics operable to transmit sensed signals from the sensing electrodes to the processing chip; and
    actuation electronics operable to transmit the actuation signals from the processing chip to the sensing electrodes.

14. The sensing chip of claim 13, wherein the sensing electronics comprise a filter, a programmable gain amplifier, and a line driver.

15. The sensing chip of claim 13, wherein the actuation electronics comprise a line driver.

16. The sensing chip of claim 12, wherein the signals received, amplified, and transmitted by the signal drivers further comprise digital select signals.

17. The sensing chip of claim 16, wherein each signal driver comprises a first buffer for the digital select signals and a second buffer for the sensed signals and actuation signals.

18. A method for receiving sensed signals from a region of sensing electrodes in a sensing chip, the method comprising, by a processing chip:
    providing power to the sensing chip;
    activating one or more columns of sensing electrodes;
    receiving a digital select signal;
    selecting one or more rows of sensing electrodes according to the digital select signal, wherein each of the sensing electrodes positioned at the intersection of the activated columns and selected rows forms the region of sensing electrodes, and each sensing electrode in the region of sensing electrodes is operable to receive sensed signals from a respective sensing element and send actuation signals to the respective sensing element to control an output of the respective sensing element, wherein each actuation signal includes a time duration, and the actuation Signals are effective to cause the sensing elements to produce a stimulation external to the device based on the time duration;

receiving the sensed signals from the region of sensing electrodes, and wherein the sensed signals are amplified during transmission between the region of sensing electrodes and the processing chip.

19. The method of claim 18, further comprising:

transmitting the actuation signals from the processing chip to the region of sensing electrodes, and wherein the actuation signals are amplified during transmission between the processing chip and the region of sensing electrodes.

20. The method of claim 18, further comprising selectively activating, by the selection transistors, subsequent rows of the sensing electrodes in an iterative manner so as to generate a scan of the sensing chip.

\* \* \* \* \*

UNITED STATES PATENT AND TRADEMARK OFFICE
CERTIFICATE OF CORRECTION

PATENT NO.         : 9,158,408 B2                                        Page 1 of 1
APPLICATION NO.    : 12/869020
DATED              : October 13, 2015
INVENTOR(S)        : Amrutur et al.

It is certified that error appears in the above-identified patent and that said Letters Patent is hereby corrected as shown below:

In The Specification

In Column 4, Line 27, delete "$105_{1,n}$," and insert -- $105_{1,n}$, --, therefor.

In Column 9, Line 12, delete "$205_{n,a}$)." and insert -- $205_{n,1}$). --, therefor.

In Column 9, Line 16, delete "$205_n$)" and insert -- $205_{n,1}$) --, therefor.

In The Claims

In Column 17, Line 6, in Claim 18, delete "Signals" and insert -- signals --, therefor.

Signed and Sealed this
Eighth Day of March, 2016

Michelle K. Lee
*Director of the United States Patent and Trademark Office*

UNITED STATES PATENT AND TRADEMARK OFFICE
CERTIFICATE OF CORRECTION

PATENT NO. : 9,158,408 B2
APPLICATION NO. : 12/869020
DATED : October 13, 2015
INVENTOR(S) : Amrutur et al.

It is certified that error appears in the above-identified patent and that said Letters Patent is hereby corrected as shown below:

On the Title Page, in Item (73), under "Assignee", in Column 1, Line 1, delete "Science (IN)" and insert -- Science, Bangalore (IN) --, therefor.

Signed and Sealed this
Twenty-third Day of August, 2016

Michelle K. Lee
*Director of the United States Patent and Trademark Office*